United States Patent [19]

Evans

[11] Patent Number: 4,541,172
[45] Date of Patent: Sep. 17, 1985

[54] IODIDE TREATMENT OF MANGANESE DIOXIDE

[75] Inventor: William P. Evans, Rocky River, Ohio

[73] Assignee: Union Carbide Corporation, Danbury, Conn.

[21] Appl. No.: 647,395

[22] Filed: Sep. 5, 1984

Related U.S. Application Data

[63] Continuation of Ser. No. 480,693, Mar. 31, 1983.

[51] Int. Cl.$^4$ ............................................. H01M 6/00
[52] U.S. Cl. ..................................... 29/623.1; 429/224
[58] Field of Search ..................................... 423/49–51, 423/490, 501, DIG. 4, 475, 605; 75/80; 429/224; 204/292, 290 R; 29/623.1

[56] References Cited

U.S. PATENT DOCUMENTS 3,767,776 10/1973 Bradford .............................. 423/475
3,990,891 11/1976 Sandberg et al. ....................... 75/80

*Primary Examiner*—Charles F. Le Fevour
*Attorney, Agent, or Firm*—Cornelius F. O'Brien

[57] ABSTRACT

A process for producing iodide-treated manganese dioxide which displays reduced abnormal initial open circuit voltage and decreased undesirable degradative reactions with cell components when employed in electrochemical cells.

5 Claims, No Drawings

IODIDE TREATMENT OF MANGANESE DIOXIDE

This application is a continuation of prior U.S. application Ser. No. 480,693, filed Mar. 31, 1983.

FIELD OF THE INVENTION

This invention relates to a novel process for the treatment of manganese dioxide in order to reduce the presence of superactive sites believed to be acidic groups on the surface of such manganese dioxide.

BACKGROUND OF THE INVENTION

The use of manganese dioxide as an active cathode material (depolarizer) in dry cells is well known. Manganese dioxide for cell use can be derived from natural manganese dioxide ores or it can be electrolytically produced by electrolyzing a manganese sulfate solution as disclosed in the publication titled "Batteries"—Vol. 1, edited by Karl V. Kordesch and published by Marcel Dekker, Inc., New York, 1974. Moreover, manganese dioxide can be produced by suitable chemical processes such as those described in Synthesis, 1976, No. 2 (February) pp. 65–104.

It is known that both electrolytic manganese dioxides (EMD) and some chemically prepared forms of manganese dioxide possess "superactive" sites on their surfaces. The presence of such superactive sites produces adverse consequences regarding the use of these manganese dioxide materials in both aqueous and nonaqueous cells.

The superactive sites on the surface of the manganese dioxide are apparently associated with an abnormally high initial open cell voltage and an undesirable reactivity with other cell components such as the organic solvents in nonaqueous electrolytes and the carbon in cathode mixes of aqueous cell systems.

It is postulated that these superactive sites are acidic in nature. It is believed that these surface acidic groups result in manganese dioxide having an ion-exchange function resulting in protons being dissociated in aqueous electrolyte solutions thus increasing the acidity of the liquid. Although the manganese dioxide used for nonaqueous cells is typically thermally treated at a high temperature and is dehydrated, it still apparently has acidic groups on its surface.

Typically, the nonaqueous electrolytes employed in such cells comprise organic solvents such as ethers and esters, for example propylene carbonate, which solvents are likely to be decomposed by very small amounts of acid or the like, resulting in the production of gas, corrosion of the anode, polymerization of the solvent and other undesirable effects.

Thus, it is desirable to find a process for neutralizing these acidic groups in order to reduce these adverse effects. The neutralization of such acidic groups is not easily accomplished as is apparent from an examination of EMD production processes. EMD is produced in an acid environment and is typically subjected to treatment with bases such as aqueous sodium hydroxide or ammonia prior to use in electrochemical cells. Nevertheless, such base treatments do not neutralize the surface acidic sites on the EMD. Moreover, it is important that treatment of manganese dioxide does not substantially reduce the normal electrochemical activity of the manganese dioxide such that the performance of such $MnO_2$ in electrochemical cells is adversely affected.

It is therefore an object of this invention to provide a process for the treatment of manganese dioxide which will substantially inactivate the superactive sites located on the surface of such manganese dioxide thereby reducing the initial open circuit voltage of electrochemical cells employing such manganese dioxide, as well as reducing the undesirable degradation reactions of cell components with such manganese dioxide in electrochemical cells.

It is a further object of this invention to provide a process for the inactivation of superactive sites on the surface of manganese dioxide, which process will not substantially reduce the peroxidation value of such manganese dioxide for use in electrochemical cells.

SUMMARY OF THE INVENTION

This invention is directed to a process for the inactivation of superactive sites on the surface of manganese dioxide, such process comprising reacting the manganese dioxide with an iodide compound selected from the group consisting of alkali metal iodides, alkaline earth metal iodides, ammonium iodide, aluminum iodide, and mixtures thereof.

Although not wishing to be held to any theory, applicant hypothesizes that the superactive sites are acidic in nature. The iodide reacts with the manganese dioxide to release elemental iodine and inactivate the acidic groups as long as there are acidic groups remaining on the surface of the manganese dioxide. Reaction does not proceed to the point of substantially reducing the peroxidation of the $MnO_2$. When potassium iodide, a preferred reactant of the process of this invention, is employed the reaction is believed to proceed as follows:

$$MnO_2 + 2KI + 4H^+ \rightarrow Mn^{+2} + I_2 + 2H_2O + 2K^+$$

The water insoluble elemental iodine so formed may then be removed from the surface of the manganese dioxide by washing with iodide ions in aqueous solution, resulting in the production of $I_3^-$ ions. These ions are soluble in aqueous solutions and may therefore be removed from the system by washing with water.

The process of the present invention involves the treatment of manganese dioxide with an iodide compound selected from the group consisting of alkaline earth metal iodides, alkali metal iodides, ammonium iodide, aluminum iodide and mixtures thereof. Representative of the iodides which may be employed are NaI, KI, RbI, CsI, $MgI_2$, $CaI_2$, $NH_4I$, $AlI_3$ and the like. When the manganese dioxide is to be employed in nonaqueous cells KI and $CaI_2$ are the preferred iodides.

Iodide should be added in an amount sufficient to react with the superactive sites present on the surface of the manganese dioxide and to provide sufficient ions in solution to complex the elemental iodine formed according to the following reaction:

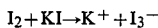

$$I_2 + KI \rightarrow K^+ + I_3^-$$

This amount will vary in accordance with the type of manganese dioxide involved. Because the process of this invention is self-limiting, the maximum amount of iodide which may be added is typically controlled by economic rather than chemical limitations.

Preferably, the iodide is reacted in the form of an aqueous solution. The concentration of the solution may vary in accordance with the particular solvent and iodide solute selected. When an aqueous solution of potassium iodide is employed, a solution containing about 1 to about 5 weight percent of potassium iodide is adequate for most types of manganese dioxide.

The reaction is preferably performed at room temperature, i.e. about 25° C., and at atmospheric pressure, although higher or lower temperatures and/or pressures may be employed.

In a typical treatment employing the process of this invention, manganese dioxide is added to reaction vessel and an aqueous iodide solution added. The iodide solution is added in sufficient quantities to react with substantially all the superactive sites on the surface of the manganese dioxide and to complex the elemental iodine formed. The reaction vessel may be composed of any material which is non-reactive with the reagents such as glass, ceramics and the like. The iodide/$MnO_2$ solution is agitated for a period sufficient to mix the material and to allow the reaction to proceed to completion. The length of the agitation step will depend upon the reaction batch size, the agitation means selected, and other similar factors.

The reaction solution is decanted and the treated manganese dioxide is washed with additional iodide solution to ensure that elemental iodine is removed by the complexing of iodide and iodine to form $I_3^-$. This step is sufficiently complete when the solution takes on no more than a faint straw color. A more sensitive test for iodine, such as a carbon disulfide test, may be employed.

The iodide-washed manganese dioxide is then typically washed repeatedly with water to ensure the removal of substantially all iodide ion. A silver nitrate test may be utilized to determine when the decanted wash water no longer contains iodide ions. The manganese dioxide is then dried by processes well known to one skilled in the art.

Manganese dioxide which has been treated in accordance with the process of this invention will possess a lower initial open cell voltage than untreated EMD when employed in electrochemical cells. When employed in electrochemical cells the iodide-treated manganese dioxide is more resistant to undesirable degradative reactions with other cell components than is untreated manganese dioxide.

The process of this invention may be employed in batch, continuous or semicontinuous operations by means well known to those skilled in the art.

EXAMPLES

The following Examples serve to give specific illustrations of the practice of this invention but are not intended in any way to limit the scope of this invention.

EXAMPLE 1

Iodide-treated electrolytic manganese dioxide was prepared as follows. Three hundred grams of Tekkosha HS ™ manganese dioxide material which contained about 92 weight percent $MnO_2$ (EMD) was added to 400 ml of a 5 weight percent aqueous solution of KI in a glass reaction vessel. The mixture was stirred overnight at room temperature in the open reaction vessel, utilizing a magnetic stirrer. The resultant product consisted of a liquid and a solid layer. The liquid layer was decanted from the solid layer, which solid layer comprised the treated EMD. The manganese dioxide was first washed with 200 ml of a 5 weight percent aqueous KI solution and subsequently repeatedly rinsed with water. The material was dried at 80° C. for 6 hours.

Standard elemental analysis of the product revealed that it was comprised of about 91 weight percent $MnO_2$.

EXAMPLE 2

Three "D" size zinc chloride cells (Cell Sample A) were constructed utilizing the iodide-treated manganese dioxide of Example 1. Each cell contained 58.5 grams of mix which consisted of a solid component comprised of 5.9 grams acetylene black, 29.9 grams of iodide-treated manganese dioxide, and 0.2 grams zinc oxide and a liquid component comprised of 23.7 grams of a 25 weight percent aqueous zinc chloride solution; a paper separator; a 22 gram 10 gauge zinc can; and top and bottom closures.

As a control, three identical cells (Cell Sample B) were constructed except that non-treated Tekkosha HS ™ manganese dioxide was employed.

The amount and composition of the gas generated by each cell sample was determined utilizing the mercury displacement test apparatus described by J. C. Cessna, *Corrosion*, Vol. 27, No. 6, June 1971, pp. 244–254, in conjunction with standardized chromatographic techniques. The average results of such testing as well as the average initial open circuit voltages of the cells are listed in Table I below.

TABLE I

| GAS GENERATION OF AQUEOUS CELLS[a] | | | |
|---|---|---|---|
| Cell Sample | $H_2$ (ml) | $CO_2$ (ml) | Initial (OCV)[b] (volts) |
| A (iodide-treated) | 7 | 17 | 1.615 |
| B (untreated) | 15 | 33 | 1.731 |

[a] cells tested for 28 days at 45° C.
[b] ocv = open circuit voltage

The above results indicate that cells employing iodide-treated manganese dioxide possess a lower initial open cell voltage vis-a-vis cells employing untreated manganese dioxide. Moreover, cells employing iodide-treated manganese dioxide generated substantially less hydrogen and carbon dioxide indicating that undesirable degradative reactions between the $MnO_2$ and other cell components was reduced.

EXAMPLE 3

Several miniature cells were constructed utilizing the iodide-treated manganese dioxide of Example 1. Such manganese dioxide was heat treated at 350° C. for seven hours prior to its inclusion in the nonaqueous cells. Each cell contained a lithium anode with a capacity of 77 milliampere hours; a cathode with a capacity of 94 milliampere hours, said cathode comprised of 94 weight percent iodide-treated Tekkosha HS ™ manganese dioxide, 3 weight percent acetylene black, and 3 weight percent of polytetrafluoroethylene; a nonwoven fiberglass separator; and 95 microliters of electrolyte comprised of 50 volume percent propylene carbonate, 50 volume percent dimethoxyethane with 1 molar LiCF$_3$SO$_3$ added.

As a control, several calls were constructed identically to those described above except that non-iodide treated EMD was employed in the cathode, such EMD being heat treated at 350° C. for 7 hours prior to being incorporated into cells.

Three fresh cells of each type (Cell Samples C and D) along with three cells of each type which had been stored for 40 days at 60° C. (Cell Samples E and F) were discharged across 30K ohms and subjected to a 2- second 400-ohm pulse 3 times per week until a 2.0 volt cutoff voltage was recorded. The average values of such testing are listed in Table II below. The cells' initial closed circuit voltage and mid-life voltage for the 30K ohm continuous discharge are also listed, as well as the initial open circuit voltage (OCV) for the fresh cells.

TABLE II

| Cell Sample | Variable | Initial Voltage[b] | Mid-life Voltage[b] | OCV[b] | Milliampere Hours to 2.0 Volts Cutoff | |
|---|---|---|---|---|---|---|
| | | | | | 30K OHM | 400 OHM |
| C | KI treated fresh | 2.96 | 2.51 | 3.44 | 76 | 64 |
| D | Untreated fresh | 3.10 | 2.42 | 3.49 | 76 | 58 |
| E | KI treated Stored[a] | 2.35 | 2.28 | | 73 | 50 |
| F | Untreated Stored[a] | 1.99 | 2.18 | | 71 | 41 |

[a] stored for 40 days at 60° C.
[b] in Volts
*Midlife Voltage is defined as the voltage at the milliampere hour which corresponds to one-half times the milliampere hour at which the voltage decreased below 2.0 volts for the 30K ohm continuous discharge.

The above results indicate that the process of this invention produces manganese dioxide which, when employed in nonaqueous cells, does not exhibit the undesirable degradative reactions with other cell components associated with untreated manganese dioxide.

What is claimed is:

1. A process for the manufacture of galvanic cells having a cathode comprising manganese dioxide, said process comprising the steps:
    (a) treating manganese dioxide with an aqueous solution of at least one iodide compound selected from the group consisting of alkali metal iodides, alkaline earth metal iodides, ammonium iodide, aluminum iodide, and mixtures thereof to form a reaction mixture and surface reacting the manganese dioxide with the iodide compound until $I_3^-$ ions are present in the reaction mixture thereby indicating that superactive acidic sites on the surface of the manganese dioxide have been inactivated;
    (b) forming the treated manganese dioxide into a cathode; and
    (c) inserting said cathode along with an anode and electrolyte into a cell housing.
2. The process of claim 1 wherein the iodide compound of step (a) is an aqueous solution of potassium iodide.
3. The process of claim 2 wherein the potassium iodide is added in an about 1 weight percent to an about 5 weight percent aqueous solution.
4. The process of claim 1 wherein the iodide compound of step (a) is an aqueous solution of calcium iodide.
5. The process of claim 1 wherein the treatment of step (a) is performed at a temperature of about 25° C. and at a pressure of about 1 atmosphere.

* * * * *